United States Patent
Krajcovic (10) Patent No.: US 8,103,892 B2
(45) Date of Patent: *Jan. 24, 2012

(54) POWER MANAGEMENT APPARATUS WITH BUCK BOOST CONVERTER MODULE

(75) Inventor: Jason Krajcovic, Ann Arbor, MI (US)

(73) Assignee: Adaptive Materials, Inc., Ann Arbor, MI (US)

( * ) Notice: Subject to any disclaimer, the term of this patent is extended or adjusted under 35 U.S.C. 154(b) by 355 days.

This patent is subject to a terminal disclaimer.

(21) Appl. No.: 12/496,217

(22) Filed: Jul. 1, 2009

(65) Prior Publication Data

US 2010/0134077 A1   Jun. 3, 2010

Related U.S. Application Data

(63) Continuation-in-part of application No. 11/739,742, filed on Apr. 25, 2007, now Pat. No. 7,814,348.

(60) Provisional application No. 60/795,006, filed on Apr. 26, 2006.

(51) Int. Cl.
*G06F 1/00* (2006.01)
*G06F 11/00* (2006.01)
*H02J 1/10* (2006.01)
*H02J 7/04* (2006.01)
*G05F 1/00* (2006.01)
*G05F 1/24* (2006.01)
*H02M 7/5383* (2007.01)
*H02M 7/00* (2006.01)
*G01R 21/00* (2006.01)

(52) U.S. Cl. .......... 713/323; 713/320; 307/43; 315/291; 320/140; 320/162; 323/259; 323/344; 363/74; 363/101; 702/60; 714/14; 714/22

(58) Field of Classification Search .......... 713/320, 713/323; 307/43; 315/291; 320/140, 162; 323/259, 344; 363/74, 101; 702/60, 601; 714/14, 22

See application file for complete search history.

(56) References Cited

U.S. PATENT DOCUMENTS

| | | | |
|---|---|---|---|
| 6,137,280 A | 10/2000 | Ackermann et al. | |
| 6,628,011 B2 * | 9/2003 | Droppo et al. | 307/43 |
| 6,902,837 B2 * | 6/2005 | McCluskey et al. | 429/9 |
| 7,138,730 B2 * | 11/2006 | Lai | 307/82 |
| 7,170,193 B2 | 1/2007 | Ferre | |
| 7,227,277 B2 * | 6/2007 | Chapman et al. | 307/43 |
| 7,227,278 B2 | 6/2007 | Realmuto et al. | |
| 7,392,143 B2 | 6/2008 | Jayabalan et al. | |
| 7,535,119 B2 * | 5/2009 | Seo | 307/46 |
| 2007/0024213 A1 | 2/2007 | Shteynberg et al. | |

* cited by examiner

*Primary Examiner* — Stefan Stoynov
(74) *Attorney, Agent, or Firm* — Dickinson Wright PLLC (57) ABSTRACT

A power management apparatus includes a first electrical lead and a second electrical lead. The first electrical lead routes electrical current at a first electrical lead electrical potential level and the second electrical lead route electrical current at a second current port electrical potential level. The power management apparatus further includes a first electrical parameter sensor configured to measure a first electrical lead electrical parameter and a second electrical parameter sensor configured to measure a second electrical lead electrical parameter. The power management apparatus further comprises a buck boost converter electrically coupled to both the first electrical lead and the second electrical lead. The buck boost converter is configured to convert electrical current between the first electrical lead electric potential level and the second electrical lead electric potential level at a controlled potential conversion level. The power management apparatus further comprises a controller is configured to receive operating current from either one of the first electrical lead and the second electrical lead. The controller is configured to monitor the first electrical parameter sensor and the second electrical parameter sensor and being configured to output control signals to the buck boost converter.

20 Claims, 7 Drawing Sheets

POWER MANAGEMENT APPARATUS WITH BUCK BOOST CONVERTER MODULE

CROSS-REFERENCE TO RELATED APPLICATIONS

This application is a continuation-in-part of U.S. patent application Ser. No. 11/739,742 filed on Apr. 25, 2007, which claims priority to U.S. Provisional Patent Application Ser. No. 60/795,006 filed Apr. 26, 2006, the entire contents of both are herein incorporated by reference.

GOVERNMENT INTERESTS

This invention was made with government support under contract number W909MY-08-C-0025, awarded by the Department of Defense. The government has certain rights in this invention.

TECHNICAL FIELD

The invention relates to an electric power management apparatus.

BACKGROUND

The material presented in this section merely provides background information to the present disclosure and may not constitute prior art. A power management apparatus can manage electrical parameters such as electrical voltage, electrical current and electrical power levels when transferring electrical energy among multiple devices.

The power management apparatus can include a buck boost converter to convert electrical parameters. Buck boost converters are DC-DC converter that can provide an output voltage that is a selected conversion magnitude greater than or less than an input voltage. The selected conversion magnitude can be determined by a control system based on sensed inputs and selected electrical parameter outputs to thereby accommodate devices having differing electrical parameter requirements. The control system can utilize an internal power device, such as an internal battery, to provide operating power. However, utilizing an internal battery provides a system failure mode when the internal battery is inoperable or discharged. Further, the internal battery adds costs, weight, and energy management inefficiency to the power management apparatus.

Power management apparatuses can measure an input electrical current level or an input electrical voltage level to convert the electrical current level or the electrical voltage level to a desired output electrical current level or output electrical voltage level. A controller can be utilized to monitor the input electrical current and voltage levels and to determine buck boost converter commands based on the input electrical current and electrical voltage levels.

When the controller is not receiving operating power, the controller does not provide buck boost converter commands to the buck boost converter and therefore, the buck boost converter is unable to control output electrical current and electrical voltage levels to desired levels.

Therefore, improved power management apparatuses are needed.

SUMMARY

A power management apparatus includes a first electrical lead and a second electrical lead. The first electrical lead routes electrical current at a first electrical lead electrical potential level and the second electrical lead routes electrical current at a second electrical lead electrical potential level. The power management apparatus further includes a first electrical parameter sensor configured to measure a first electrical lead electrical parameter and a second electrical parameter sensor configured to measure a second electrical lead electrical parameter. The power management apparatus further comprises a buck boost converter electrically coupled to both the first electrical lead and the second electrical lead. The buck boost converter is configured to convert electrical current between the first electrical lead electric potential level and the second electrical lead electric potential level at a controlled electrical potential conversion level. The power management apparatus further comprises a controller configured to receive operating current from either one of the first electrical lead and the second electrical lead. The controller is configured to monitor the first electrical parameter sensor and the second electrical parameter sensor and is configured to output control signals to the buck boost converter.

It should be understood that the appended drawings are not necessarily to scale, presenting a somewhat simplified representation of various preferred features illustrative of the basic principles of the invention. The specific design features of the power management apparatus will be determined in part by the particular intended application and use environment. Certain features of the illustrated embodiments have been enlarged or distorted relative to others for visualization and understanding. In particular, thin features may be thickened for clarity of illustration.

DETAILED DESCRIPTION OF THE EMBODIMENTS

Figure 1:
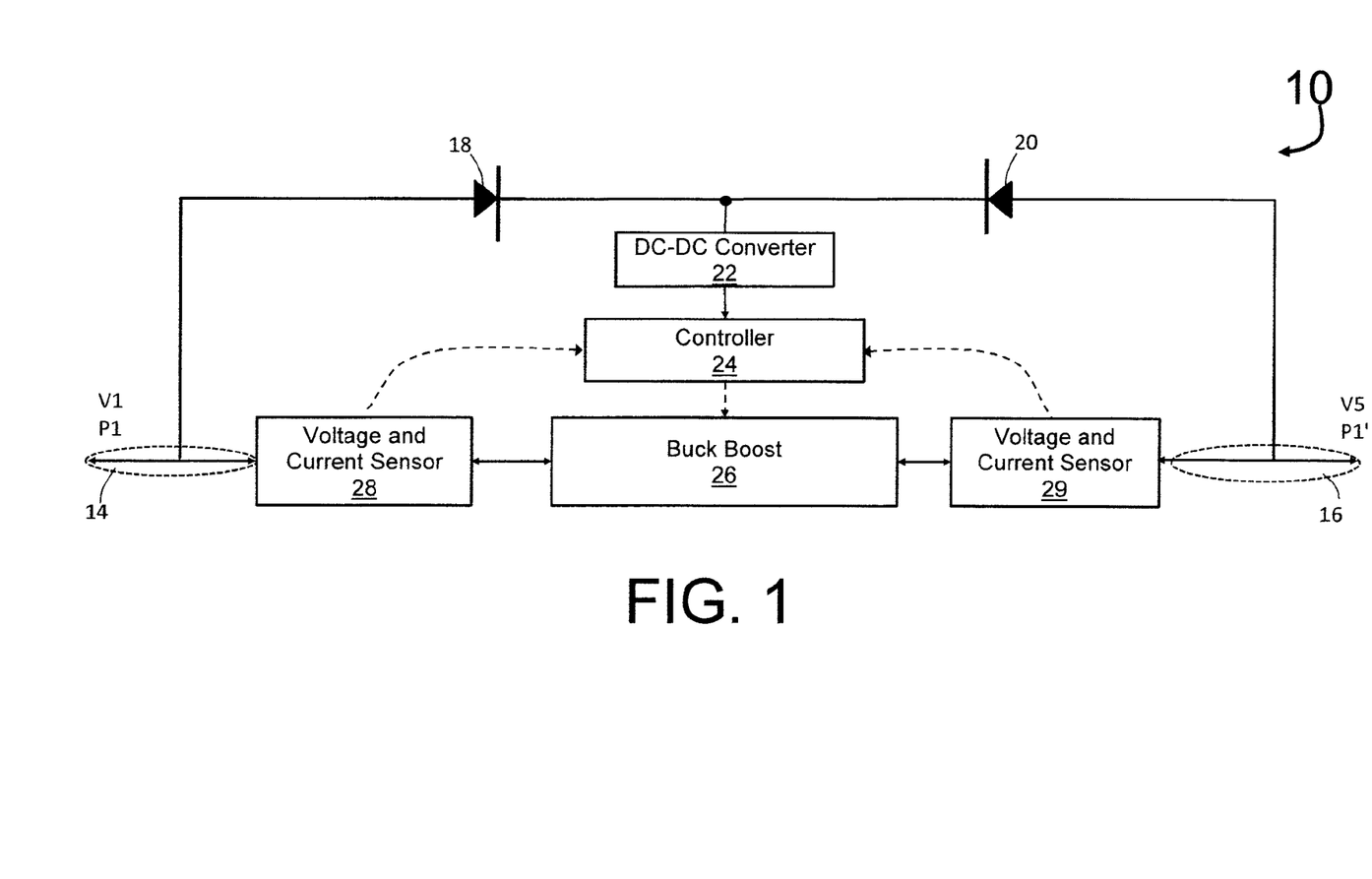
FIG. 1 is a schematic diagram of a buck boost converter module in accordance with an exemplary embodiment of a present disclosure.

The schematics diagrams of FIG. 1-4, depict schematic diagrams wherein power paths are generally depicted as solid lines and wherein data paths are generally depicted as dashed lines. Referring to FIG. 1, a buck boost converter module 10 is provided to convert voltage between a first voltage level at a first electrical lead 14 and a second voltage level at a second electrical lead 16. The buck boost converter module 10 includes first and second electrical leads 14 and 16, diodes 18 and 20, a DC-DC converter ('DC-Converter') 22, a controller ('Controller') 24, a buck boost converter ('Buck Boost') 26 and voltage and current sensors 'voltage and current sensors' 28 and 30.

The electrical leads 14 and 16 are portions of the buck boost converter module 10 routing electric power to and from the buck boost converter 26 can generally be considered as electrical inlet and electrical outlet portions of the buck boost converter module 10. The diodes 18 and 20 each selectively allow current flow in one directional while preventing current flow in the opposite direction. In particular, the diode 18 allows current flow in a direction from the first electric lead 14 to the DC-DC converter 22 while prevent current flow in the opposite direction and the diode 20 allows current flow in a from the second lead 16 to the DC-DC converter 22 while preventing current flow in the opposite direction. Therefore, the diodes 18 and 20 enable current flow to the DC-DC Converter 22 and to the controller 24 from only the electrical lead 14, 16 having the voltage level.

The DC-DC converter 22 is provided to receive electric current at an input voltage level and output electric current to the controller 24 at a desired voltage level for operating the controller 24.

The voltage and current sensor 28 measures voltage levels and current levels at the electrical lead 14 and the voltage and current sensor 30 measures voltage levels and current levels at the electrical lead 16. The voltage and current sensor 28 can comprises a single sensor assembly or multiple sensor assemblies, i.e., a separate voltage sensor assembly and current sensor assembly.

The controller 24 monitors voltage levels and current levels from each of the voltage and current sensors 28 and 30. The controller 24 determines control commands for controlling the buck boost converter 26 based on the monitored voltage levels and current levels. The controller 24 provides output signals comprising control commands to the buck boost converter 26.

The buck boost converter 26 can adjust the voltage difference between the first electrical lead 14 and the second electrical lead 16. In an exemplary embodiment, the buck boost converter utilizes a switching transistor to provide a voltage difference between the first electrical lead and the second electrical lead. The duty cycle of the switching transistor is controlled by the controller 24 utilizing closed-loop feedback control.

Although in an exemplary embodiment, the controller 24 determines control commands for controlling the buck boost converter 26 based on both the monitored voltage levels and current levels, in alternate embodiments, a controller can control a buck boost converter utilizing only signals indicative of current, only signals indicative of voltage, or combinations of signals indicative of current and voltage. For example, in one embodiment, the controller controls the buck boost converter based on voltage levels measured on opposite sides of a buck boost converter. In alternate embodiment, a controller controls the buck boost converter based on electric current levels measured on opposite sides of the buck boost converter.

FIG. 1 depicts power level ('P1') and voltage level ('V1') of the first electrical lead 14 and power level ('P1') and voltage level ('V5') of the second electrical lead 16. The difference in power levels between P1 and P1' represents resistive power losses, power losses associated with voltage conversion within the buck boost converter modules 10, and power utilized to operate components of the buck boost converter module 10 such as the controller 24.

Figure 2A:
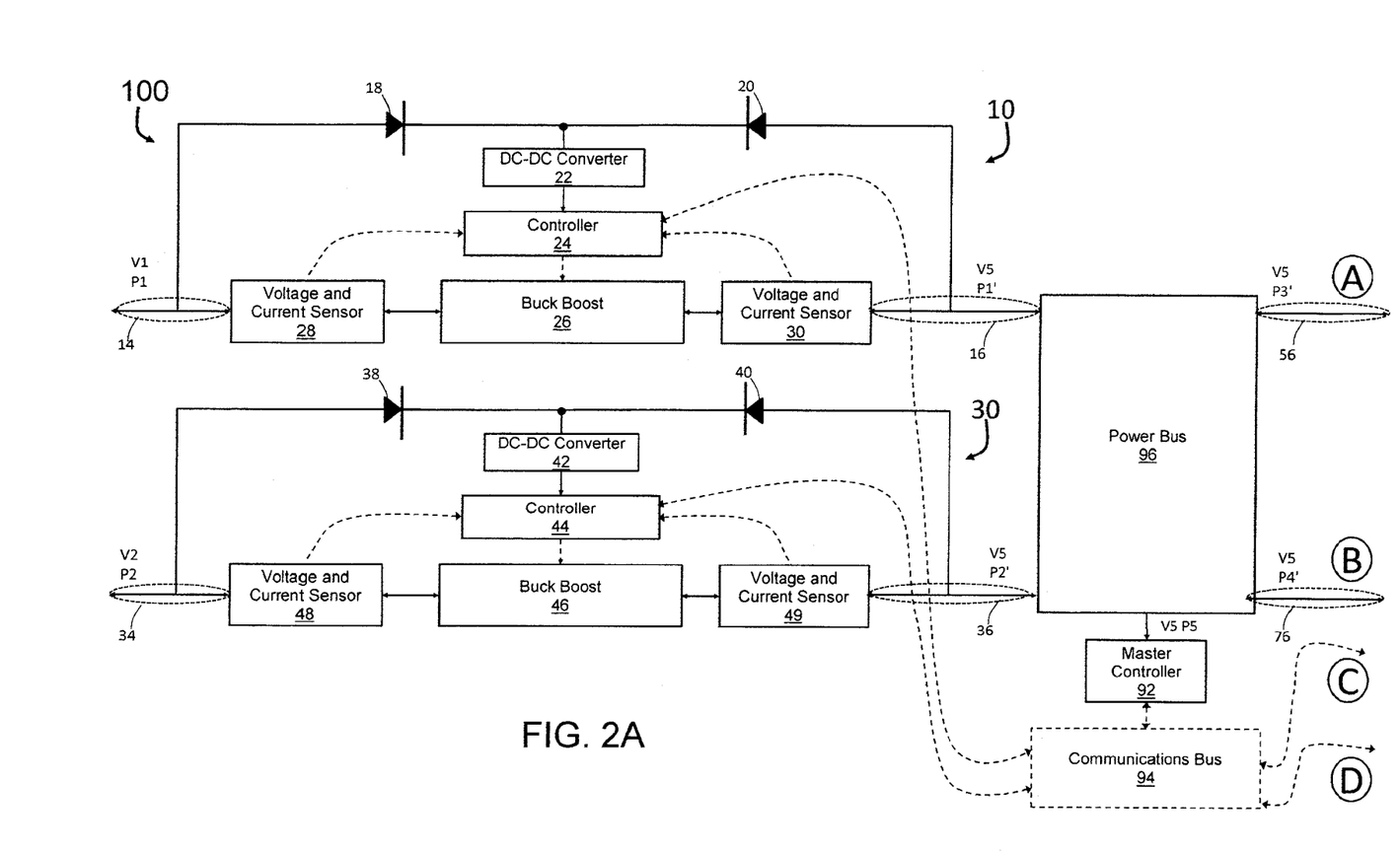
FIG. 2 is a schematic diagram of a power management apparatus including the buck boost converter module of FIG. 1 in accordance with an exemplary embodiment of the present disclosure.
Figure 2B:
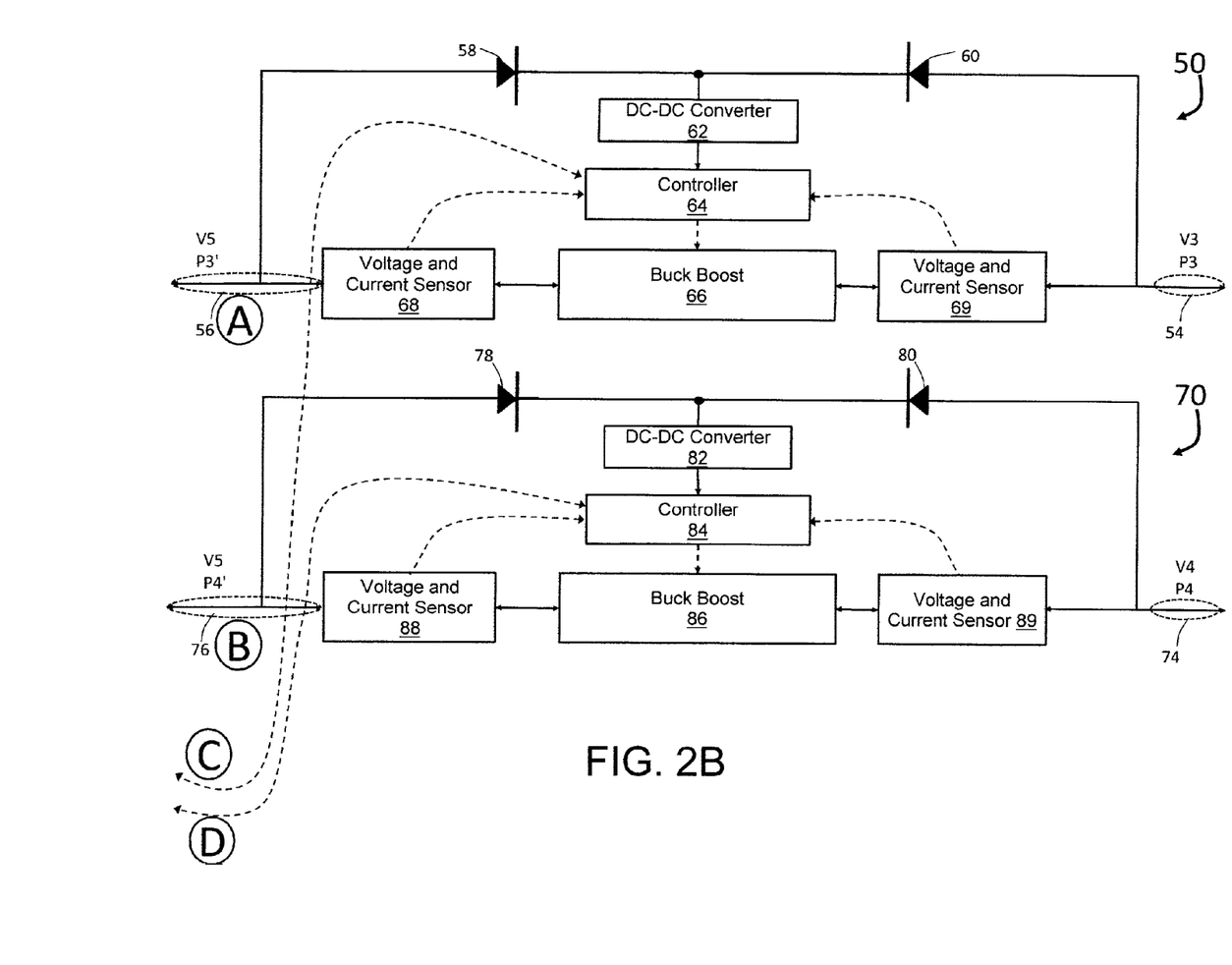

FIG. 2 depicts a power management apparatus 100 including the buck boost converter module 10, a buck boost converter module 30, a buck boost converter module 50, a buck boost converter module 70, a power bus 96, a master controller 92, and a communications bus 94.

The buck boost converter modules 30, 50, and 70 comprise substantially similar components to those of the buck boost converter module 10. The buck boost converter modules 10, 30, 50 and 70 each allow for bi-direction transmission of electric power between the power bus 96 and an external device.

The buck boost converter module 30 comprises electrical leads 34 and 36, diodes 38 and 40, a DC-DC Converter ('DC-Converter') 42, a controller ('Controller') 44, a buck boost converter ('Buck Boost') 46 and voltage and current sensors ('Voltage and Current Sensors') 48 and 49.

The buck boost converter module 50 comprises electrical leads 54 and 56, diodes 58 and 59, a DC-DC Converter ('DC-Converter') 52, a controller ('Controller') 54, a buck boost converter ('buck boost') 56 and voltage and current sensors ('voltage and current sensors') 68 and 69.

The buck boost converter module 70 comprises electrical leads 74 and 76, diodes 78 and 70, a DC-DC Converter 'DC-Converter' 82, a controller ('Controller') 84, a buck boost converter 'buck boost' 86 and voltage and current sensors 'voltage and current sensors' 88 and 89.

The power bus 96 transmits electrical energy to components of the power management system 100 including the buck converting modules 10, 30, 50, and 70, and the master controller 92. The power bus 96 is maintained at a nominal voltage ('V5') or within a nominal voltage range.

The master controller 92 receives power ('P5') from the power bus 96. Further, the master controller 92 receives input signals from and sends output signals to the controllers 24, 44, 64, and 84 via the communications bus 94. The master controller 92 includes a central processing unit (CPU) (not shown) that includes a real-time operating system and programs actively controlling a power usage. The CPU can determined control commands based on the input signals and send output signals comprising the control commands to each of the controllers 24, 44, 64, and 84.

The master controller 92 can actively manage power to and from external devices having differing priorities. For example, when an energy source such as a battery having a limited amount of stored energy is coupled to power management apparatus 10, the master controller 92 can actively manage input and output power to other devices to provide desired battery operating life. Further, the master controller 92 can continuously provide electric power to a first device having a highest priority, for example a radio, while providing power only intermittently to a second device having a lower priority than the first power device, for example, a light source.

Figure 5:
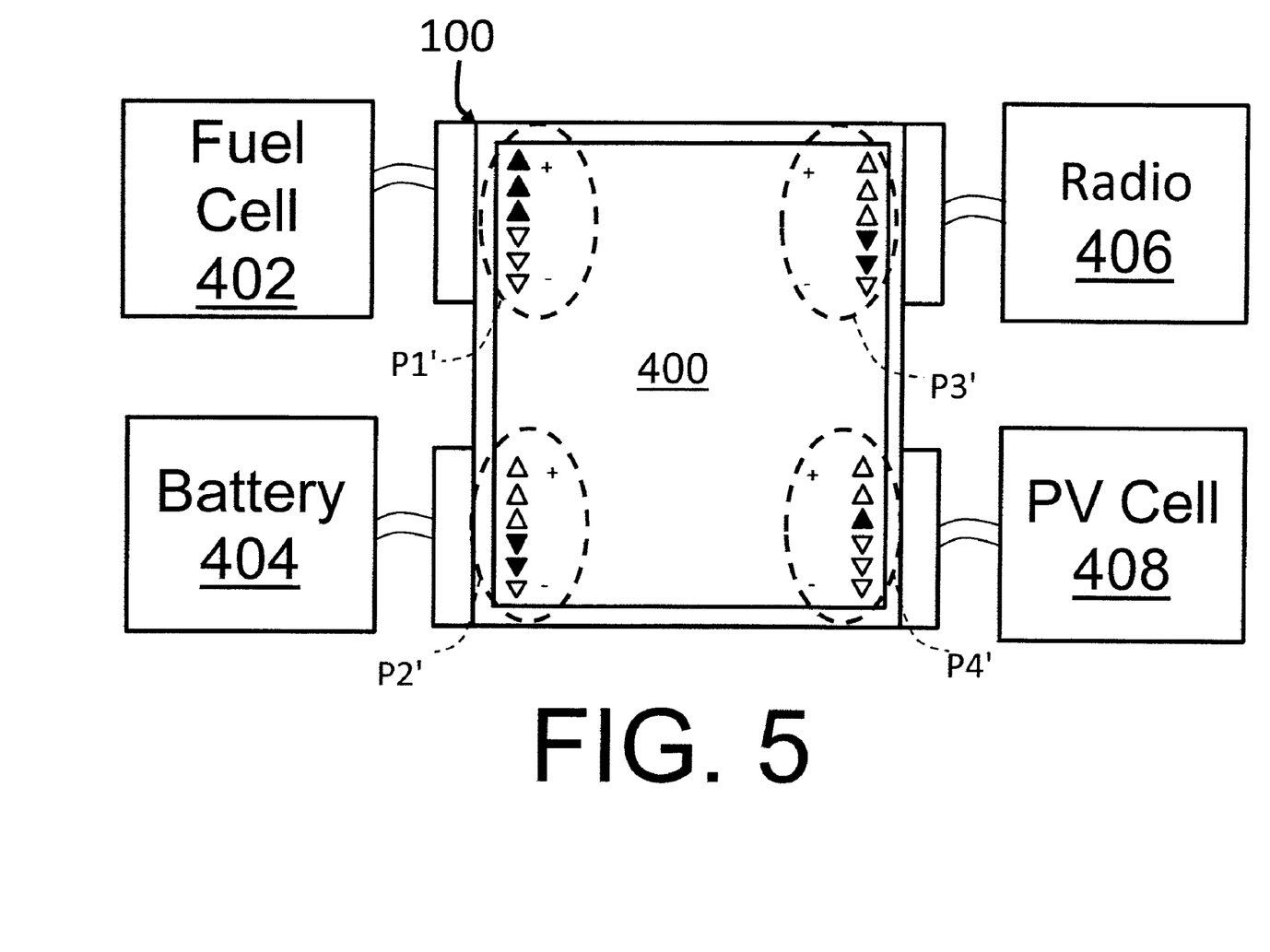
FIG. 5 is a front view of a power management apparatus of FIG. 2 in accordance.

Each priority can be assigned by master controller 92 or can be directly inputted by a user through a graphic user interface 400 (FIG. 5). Additionally, the master controller 92 can determine mutually exclusive activities of the external devices and adjust a power or current to at least one of the devices. In this manner, devices that may not be operable at the same time are regulated by the power management apparatus to prevent current from being delivered to one or more of the external devices to preserve an amount of power of a storage device coupled to the power management apparatus.

As stated above, the power management apparatus 100 automatically identifies external devices that are connected to the ports and automatically adjusts one or more parameters appropriate for the external connected device. In this manner, various devices may be connected to the power management apparatus 100 wherein the power management apparatus automatically determines the type of device connected and provides a necessary power to the device. Additionally, the power management apparatus through the use of the real-time operating system and programs can allow a user to select from a desired energy management mode. The energy management modes may be stored in the memory of the CPU or may be custom tailored by a user for customizing devices that may be connected to the power management apparatus 100.

Figure 3A:
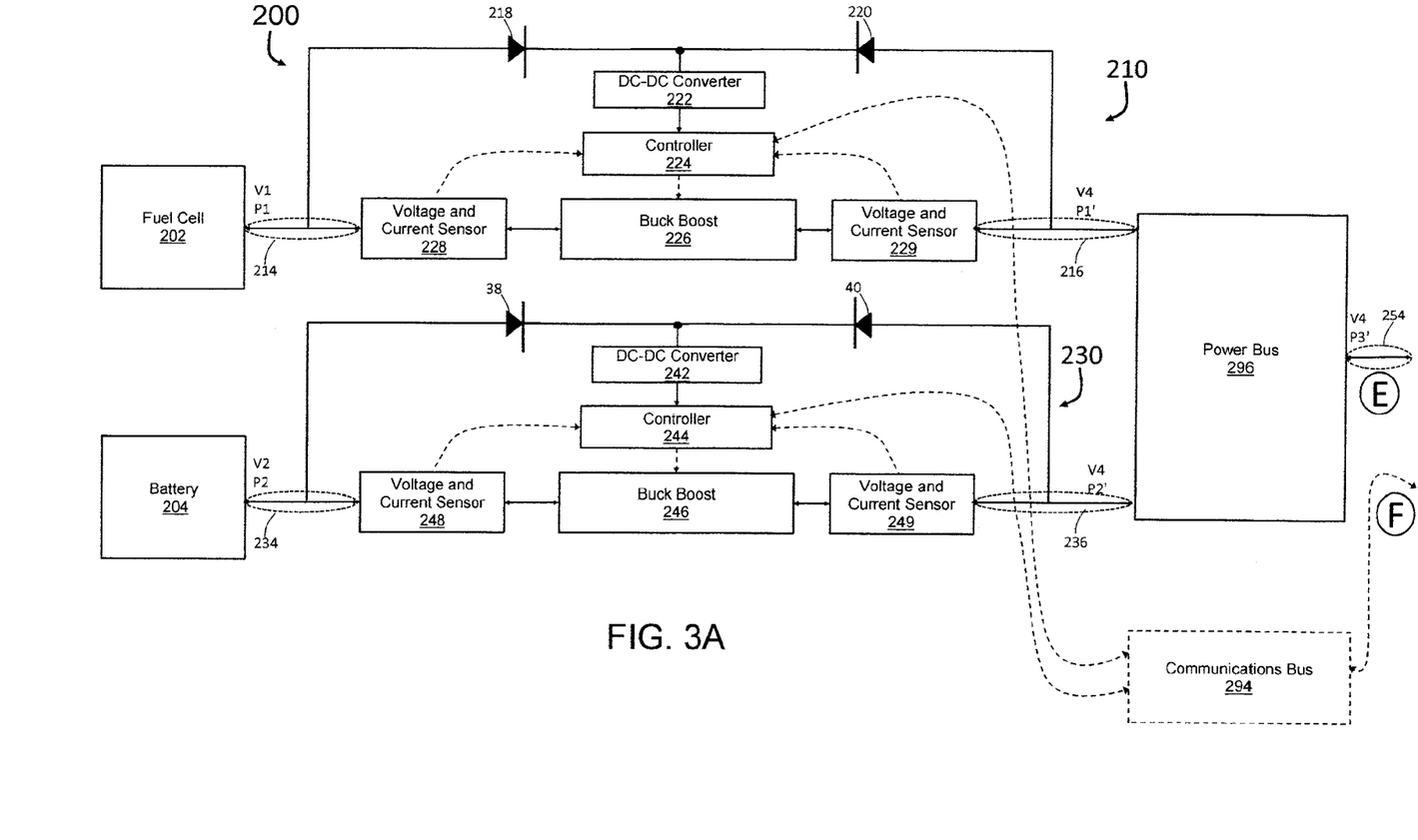
FIG. 3 is a schematic diagram of a power management apparatus in accordance with another exemplary embodiment of the present disclosure.
Figure 3B:
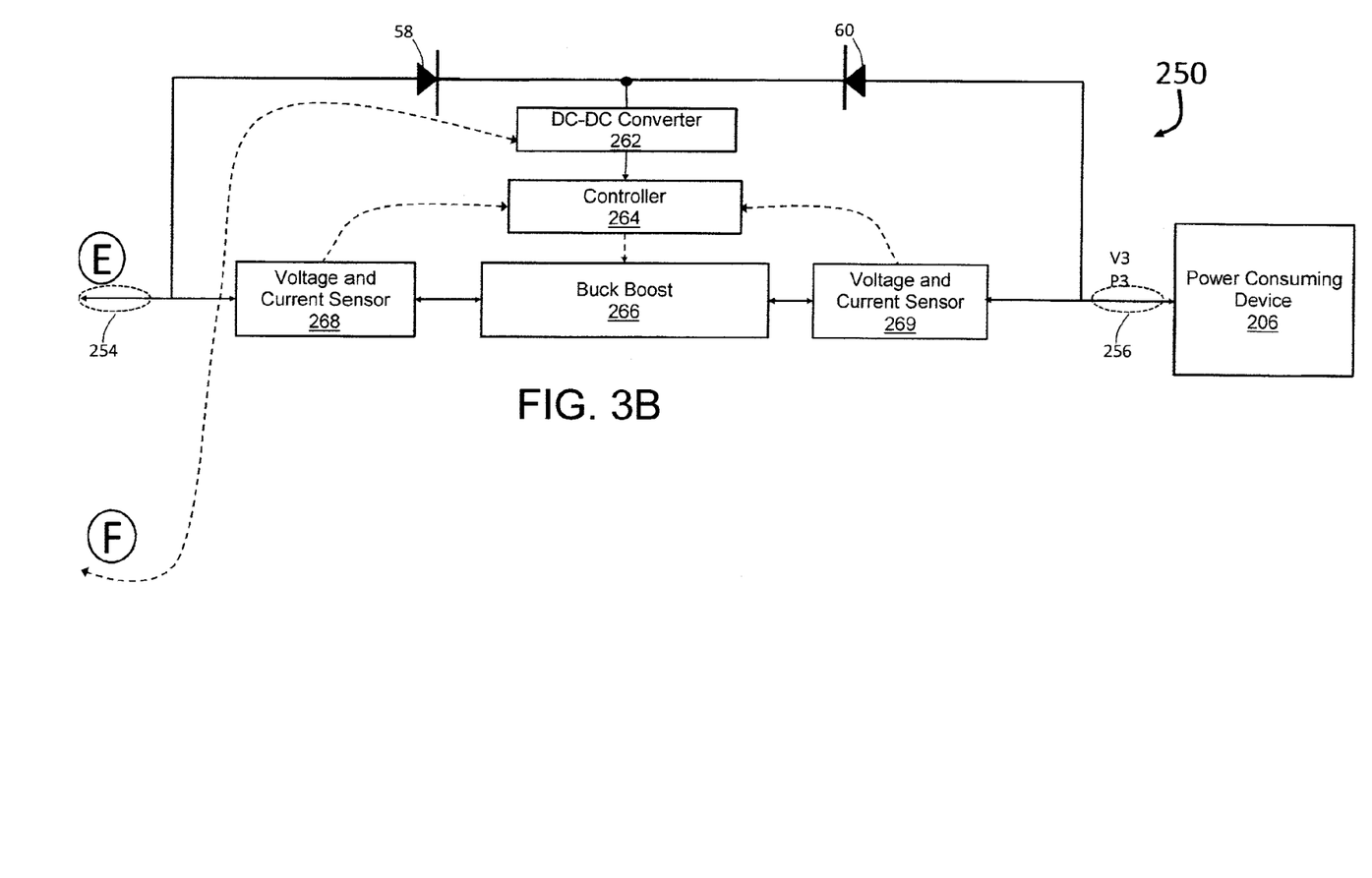

FIG. 3 depicts a power management apparatus 200 having a buck boost converter module 210, a buck boost converter module 230, and a buck boost converter module 250. The buck boost converters 210, 230, and 250 are substantially similar to the buck boost converter 10 described above. The buck boost converter module 210 is electrically connected to a fuel cell 202 wherein the buck boost converter 210 converts a voltage level V1 of the fuel cell 202 to a voltage level V4 of the power bus 296. The buck boost converter module 230 is electrically connected to a battery 204, wherein the buck boost converter module 230 provides bi-directional power flow between power bus 296 and the battery 204. The buck boost converter module therefore can adjust voltage ('V4') to receive current from the power bus 296, thereby charging the battery 204 or to provide current to the power bus 296, thereby charging the battery 204.

The buck boost converter module 250 is electrically connected to a power consuming device 206 wherein the buck boost converter 210 converts a power bus voltage V4 to the desired operating voltage (V3) of the power consuming device 206.

Each of the controller 224, the controller 244, and the controller 264 can transmit and receive control signals from the communications bus 294. Therefore, each of the controllers 224, 244, 264 can receive voltage and current measurement levels from the other two controllers and determine control commands based on the voltage and current measurements of the other control modules along with the voltage and current measurements within their respective control modules. In an alternate embodiment, the buck boost converter module 200 can have a master controller in addition to or instead of the distributed controllers 224, 244, and 264.

Figure 4:
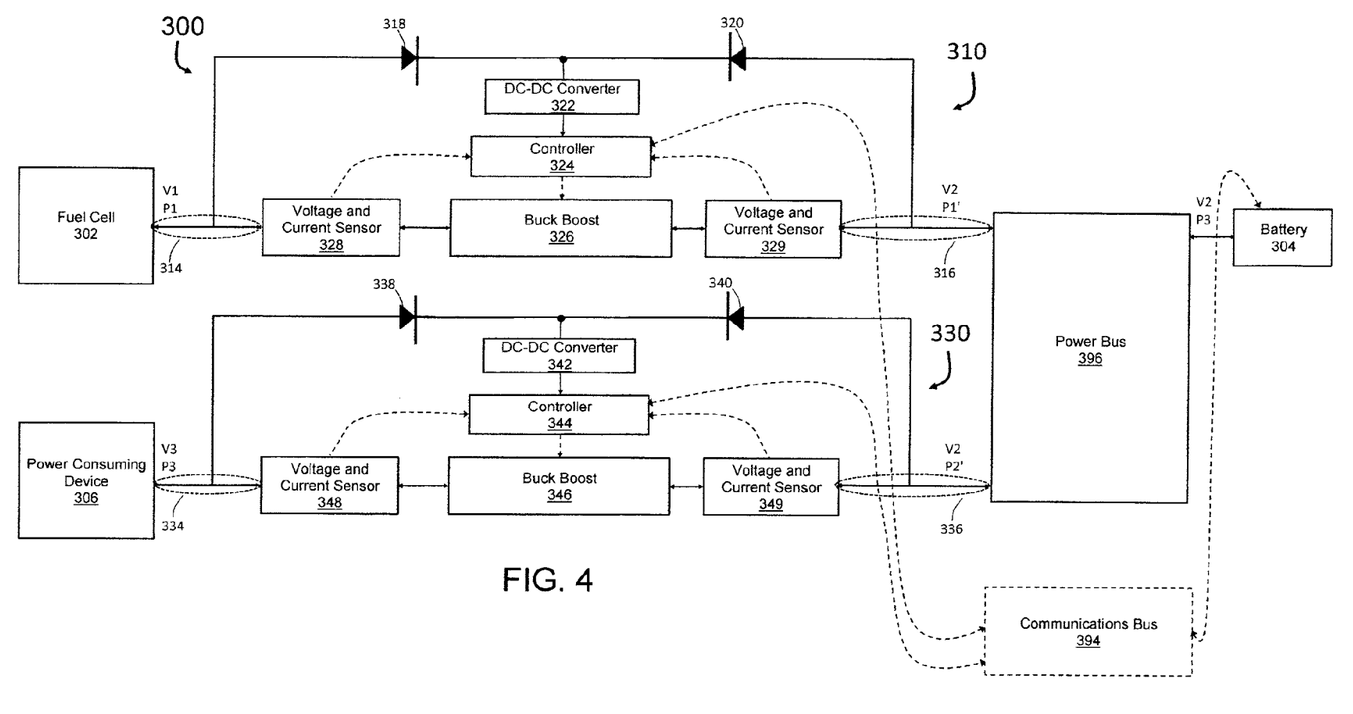
FIG. 4 is a schematic diagram of a power management apparatus in accordance with another exemplary embodiment of the present disclosure.

FIG. 4 depicts a power management system 300. The power management system 300 comprises a buck boost converter module 310, a buck boost converter module 330, and a buck boost converter module 350.

FIG. 4 depicts a power management apparatus 300 having a buck boost converter module 310, a buck boost converter module 330, and a buck boost converter module 350. The buck boost converter module is substantially similar to the buck boost converter module 310 described above. The buck boost converter module 310 is electrically connected to a fuel cell 302, wherein the buck boost converter 310 converts a voltage level ('V1') of the fuel cell 302 to a voltage level V4 of the power bus 396.

The buck boost converter module 350 is substantially similar to the buck boost converter module 230 described above. The buck boost converter module 330 is electrically connected to a power consuming device, wherein the buck boost converter 310 converts a voltage level V1 of the fuel cell 330 to a voltage level V4 of the power bus 396.

The battery 304 is directly electrically coupled to the power bus 396 and therefore, the battery voltage is approximately equal to the power bus voltage. Further, battery charges and discharges based on the power bus voltage. When the power bus voltage is greater than the battery charging voltage, the battery accepts charge. When the battery bus voltage is greater than the battery charging voltage, the battery discharges. The battery charging voltage depends on the battery state of charge.

FIG. 5 shows a front view of the exemplary power management apparatus 100. The power management apparatus 100 comprises a graphical user interface 400. The graphically user user interface can be selected from various types of interfaces including aural, tactile or optical interfaces. The master controller 92 can send and receive information from the graphical user interface 400 and receive user inputs from the graphical user interface 400.

The graphical user interface 400 depicts graphical indicia indicating the hybrid power levels P1, P2, P3, and P4. In FIG. 5 the power P1 represents power transferred between the power bus 96 and the fuel cell 402, P2 represents power transferred between the power bus 96 and the battery 204, P3 represents power transferred between the power bus 96 and the radio 406, and P4 represent power transferred between the power bus 96 and the 408. Each indicia comprises a plurality of triangles, and the number of triangles filled is indicative of power transfer rate, wherein upper triangles being filled-in indicates power being provided from the external device to the power bus and lower triangles being filled-in indicates power being provided from the power bus to the external device. For example, when the power transferred from the external device to the power bus 96 is a high power level (as shown by Fuel Cell 402 power ('P1')), all three upper triangles are filled-in, there from. When power transferred between the external device and the power bus 96 is low only one of the three triangles is filled. When the hybrid power level is substantially zero or negative, none of the triangles is filled. When the external device comprises a rechargeable battery (e.g., battery 404) the number of triangle filled-in is indicative of charging rate or discharging rate of the battery.

The invention has been described in an illustrative manner. It is to be understood that the terminology which has been used is intended to be in the nature of words of description rather than limitation. Many modifications and variations of the invention are possible in light of the above teachings. Therefore, within the scope of appended claims, the invention may be practiced other than specifically described.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A power management apparatus comprising:
a first electrical lead routing electrical current at a first electrical lead electric potential level;
a first electrical parameter sensor configured to measure a first electrical lead electrical parameter;
a second electrical lead routing electrical current at a second electrical lead electric potential level;
a second electrical parameter sensor configured to measure the second power electrical parameter;
a buck boost converter electrically coupled to both the first electrical lead and the second electrical lead, the buck boost converter being configured to convert electrical current between the first electrical lead electric potential level and the second electrical lead electric potential level at a controlled potential conversion level; and
a controller being configured to receive operating current from either one of the first electrical lead and the second electrical lead, the controller configured to monitor the first electrical parameter sensor and the second electrical parameter sensor and being configured to output control signals to the buck boost converter, said control signals being determined based on the first electrical lead electrical parameter and the second electrical lead electrical parameter.

2. The power management apparatus of claim 1, further comprising:
a first diode disposed in an electrical current flow path between the controller and the first electrical lead; and
a second diode disposed in an electrical current flow path between the controller and the second electrical lead,
wherein electric current having the highest electrical potential of one the first electrical lead electric potential level and the second electrical lead electric potential level is routed to the controller.

3. The power management apparatus of claim 1, wherein the first electrical parameter sensor is configured to measure a first electrical lead voltage level.

4. The power management apparatus of claim 1, wherein the first electrical parameter sensor is configured to measure a first electrical lead current level.

5. The power management apparatus of claim 1, further comprising a power bus electrically connected to the second electrical lead such that the second power potential difference is substantially equal to a power bus electrical potential difference.

6. The power management apparatus of claim 1, further comprising a fuel cell electrically connected to the second electrical lead.

7. The power management apparatus of claim 1, further comprising further comprising a battery electrically connected to the second electrical lead.

8. The power management apparatus of claim 1, further comprising a power consuming device electrically connected to the second electrical lead.

9. A power management apparatus comprising:
a plurality of buck converting modules electrically connected to a power bus, the power bus operating at a power bus electric potential level,
each buck converting module comprising:
a first electrical lead routing electrical current at the power bus electric potential level;
a first electrical parameter sensor configured to measure a first electrical lead electrical parameter;
a second electrical lead routing electrical energy at a second electrical lead electric potential level;
a second electrical parameter sensor configured to measure the second power electrical parameter;
a buck boost converter electrically coupled to both the first electrical lead and the second electrical lead, the buck boost converter being configured to convert electrical current between the power bus electric potential level and the second electrical lead electric potential level at a controlled potential conversion level; and
a controller being configured to receive operating current from either one of the first electrical lead and the second electrical lead, the controller configured to monitor the first electrical parameter sensor and the second electrical parameter sensor and being configured to output control signals to the buck boost converter, said control signals being determined based on the first electrical lead electrical parameter and the second electrical lead electrical parameter.

10. The power management apparatus of claim 9, wherein each buck converting module further comprises:
a first diode disposed in an electrical current flow path between the controller and the first electrical lead; and
a second diode disposed in an electrical current flow path between the controller and the second electrical lead,
wherein electric current having the highest electrical potential of one the power bus electric potential level and the second electrical lead electric potential level is routed to the controller.

11. The power management apparatus of claim 9, wherein the first electrical parameter sensor is configured to measure the power bus electric potential level.

12. The power management apparatus of claim 9, further comprising a battery electrically connected to the power bus, wherein the battery electric potential level is substantially equal to the power bus electric potential level.

13. The power management apparatus of claim 9, further comprising a battery electrically connected to a second electrical lead of one of the buck boost converter modules.

14. The power management apparatus of claim 9, wherein the plurality of buck boost converter modules comprises at least three buck boost converter modules.

15. The power management apparatus of claim 9, further comprising a graphical user interface displaying a plurality power level indicia, wherein each power level indicia indicates a power level provided to the power bus by one of the buck boost converter modules.

16. The power management apparatus of claim 9, wherein a power consuming device is electrically connected to one of the buck boost converter modules.

17. The power management apparatus of claim 16, wherein a fuel cell is electrically connected to one of the buck boost converter modules.

18. The power management apparatus of claim 16, wherein a photovoltaic device is electrically connected to one of the buck boost converter modules.

19. The power management apparatus of claim 16, wherein a battery is electrically connected to one of the buck boost converter modules.

20. The power management apparatus of claim 16, wherein a battery is electrically connected to one of the buck boost converter modules and a fuel cell is electrically connected to one of the buck boost converter modules.

* * * * *